United States Patent Office 2,713,072
Patented July 12, 1955

2,713,072

PRODUCTION OF BIS(HYDROXYARYL) SUBSTITUTED COMPOUNDS

Hans Dannenberg, Berkeley, Calif., assignor to Shell Development Company, Emeryville, Calif., a corporation of Delaware No Drawing. Application November 24, 1952, Serial No. 322,345

9 Claims. (Cl. 260—619)

This invention relates to the production of bis(hydroxyaryl) compounds and relates more particularly to the production of hydroxyphenyl-substituted alkanes wherein the nuclei of two phenolic radicals are directly attached to a single carbon atom in the alkyl group. A particular aspect of the invention relates to the production of gem,bis-di(hydroxyphenyl) propane.

Hydroxyphenyl-substituted compounds such as, for example, the bis-di(hydroxyphenyl) alkanes are of great value in important fields of application. They are employed as starting and intermediate materials in the production of a wide variety of organic products. Methods for their production disclosed heretofore generally involve the condensation of a phenolic compound with a carbonyl compound, for example, a ketone. Large scale production of hydroxyphenyl-substituted alkanes under economically feasible conditions is therefore governed to some extent by the availability of the phenolic starting materials.

Potential sources of phenolic compounds comprise certain organo-hydroperoxides, such as aryl-alkyl hydroperoxides obtained by oxidation of the corresponding aromatic hydrocarbons. To the best of applicant's knowledge, no disclosure has been made public of a method enabling direct conversion of organo-hydroperoxides to products comprising substantial amounts of bis,di-(hydroxyphenyl) alkanes. Methods have been disclosed for the decomposition of aralkyl hydroperoxides, such as cumene hydroperoxide, at specific conditions of operation, to reaction products comprising phenol. However, utilization of cumene hydroperoxide as the source of the phenol to be used as the starting material for the large scale production of bis(hydroxyphenyl) substituted alkanes therefrom has heretofore been beset with serious difficulties. The extreme sensitivity of behavior characteristics of the hydroperoxides to changes in the nature of composition of even exceedingly small amounts of impurities which may be present, and to changes in process conditions employed, tends to cause constant variation in the decomposition products obtained therefrom. The relatively involved and difficult operational procedures often necessary to effect the separation of phenol in a requisite state of purity from the first, or decomposition stage, of such process adds materially to the overall cost of producing the desired bis(hydroxyphenyl) alkanes from the organo hydroperoxides by such a two stage method.

In co-pending application Serial No. 251,832, filed October 17, 1951, now U. S. Patent 2,669,588, issued February 16, 1954, it is disclosed and claimed that bis,di-(hydroxyaryl) compounds are obtained directly from available substituted aromatic organo hydroperoxides by contacting a substituted aromatic organo hydroperoxide with a phenolic compound in an acid medium in the presence of a substantial amount of the phenolic reactant. Thus, in accordance with the invention of the co-pending application bis,di-(hydroxyphenyl) alkanes such as, for example, gem,di(4-hydroxyphenyl) alkanes, are produced by reacting an α,α-dialkylphenylmethyl hydroperoxide with added phenol in the presence of a strong mineral acid and of a mole ratio of the added phenol to the α,α-dialkylphenylmethyl hydroperoxide of at least 1:1. This is indeed surprising and unexpected since it is indicated in the literature of the prior art, as exemplified by British Patent 629,429, that under the conditions employed in processes available heretofore for the acid catalyzed decomposition of aralkyl hydroperoxides the condensation of phenols with carbonyl compounds does not take place.

The method of the co-pending application above-referred to requires as essential thereto the presence at the very start of the reaction of the substantial amount of added phenol. Without intent to limit in any wise the scope of the claimed invention by theory advanced herein to set forth more clearly the nature thereof, it is believed that the absence of any substantial amount of the ketone during the initial phase of the reaction may well be highly desirable, if not essential, to the attainment of the desired results. Although the process of the co-pending application enables the efficient production of the desired bis,di-(hydroxyphenyl) compounds, it is nevertheless dependent upon the availability of the substantial amounts of phenol from an outside source.

It has now been found that mixtures comprising substantial amounts of the desired bis,di-(hydroxyaryl) compounds are obtained directly from available substituted aromatic organo hydroperoxides without the need of phenol addition from an outside source by contacting the substituted aromatic organo hydroperoxide with a strong mineral acid in the presence of an auxiliary catalyst consisting essentially of an ionizable sulfur compound. The reaction mixtures obtained generally contain the bis,di-(hydroxyaryl) compounds as the predominant reaction product and are of a nature enabling the efficient recovery of the bis,-di-(hydroxyaryl) compounds therefrom.

In accordance with the present invention bis,di-(hydroxyphenyl) alkanes such as, for example, gem,di-(hydroxyphenyl) alkanes, are produced by contacting an α,α-dialkylphenylmethyl hydroperoxide with a strong mineral acid in the presence of a catalytic amount of an added sulfur compound consisting essentially of an ionizable sulfur compound.

The process of the present invention, thus, enables the direct single stage production of hydroxyaryl-substituted compounds such as, for example, bis(hydroxyphenyl) alkanes, from readily available aralkyl hydroperoxides.

The broad class of organo hydroperoxides which may be converted in accordance with the invention is represented by the empirical formula

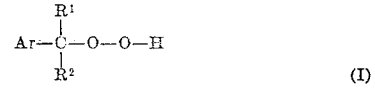
(I)

wherein Ar is an aromatic hydrocarbon radical selected from the group consisting of aryl and alkaryl groups which have at least one replaceable nuclear hydrogen atom, and $R^1$ and $R^2$ each represent the same or a different member of the group consisting of hydrogen and any monovalent organic radical, aliphatic, cycloaliphatic, aromatic, heterocyclic, including hydrocarbon radicals such as alkyl, cycloalkyl, aryl, aralkyl, alkaryl, saturated and unsaturated groups. The radical Ar may be mono- or poly-nuclear. The organo hydroperoxide employed in the process of the invention may be obtained from any suitable source and include those obtained by the oxidation of aromatic organic compounds having the structural formula

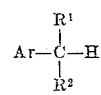

wherein Ar, $R^1$, and $R^2$ have the same significance as in the previously described structural Formula I for the organo hydroperoxides.

Preferred organo hydroperoxide compounds employed in the present invention are the aralkyl hydroperoxides comprising the hydroperoxides of the alkyl benzenes which have at least one replaceable hydrogen atom directly attached to the benzene ring and in which the hydroperoxide group (—O—O—H) is linked to an aliphatic carbon atom which is directly attached by a single bond to a nuclear carbon atom in the benzene ring. The suitable alkyl benzene hydroperoxides are represented by the empirical formula

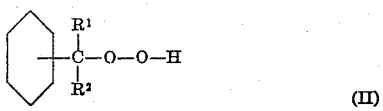

(II)

wherein the $R^1$ and $R^2$ represent the same or different members of the group consisting of hydrogen and hydrocarbon radicals such as alkyl, cycloalkyl, aryl, alkaryl, and aralkyl. The radical $R^1$ may be joined to the radical $R^2$ to form a cyclic nucleus containing the carbon atom to which the hydroperoxide group is attached. One or more replaceable hydrogen atoms attached to the benzene nucleus except at least one may be substituted by an aliphatic hydrocarbon radical such as alkyl and cycloalkyl radicals.

The above defined alkyl benzene hydroperoxides may be referred to as members of the class consisting of benzyl hydroperoxide and hydrocarbyl-substituted benzyl hydroperoxides such as alkyl- and cycloalkyl-substituted benzyl hydroperoxides.

Particularly preferred are the secondary and tertiary alkyl benzene hydroperoxides wherein the hydroperoxyl (—O—O—H) group is attached to a secondary or tertiary carbon atom which is in turn directly linked by a single bond to the benzene nucleus. These preferred alkyl benzene hydroperoxides, that is, α,α-dialkylphenylmethyl hydroperoxides, are represented by the above Formula II when both of the radicals $R^1$ and $R^2$ are the same or different members of the group consisting of alkyl and cycloalkyl radicals.

Examples of the above-defined organo hydroperoxides are:

Benzyl hydroperoxide
p-xylyl hydroperoxide
α-phenylethyl hydroperoxide
α-propyl benzyl hydroperoxide
α,α-dimethylbenzyl hydroperoxide
α-ethyl-α-methylbenzyl hydroperoxide
α,α-dimethyl-p-methylbenzyl hydroperoxide
α,α-dimethyl-p-isopropylbenzyl hydroperoxide
Diphenylmethyl hydroperoxide
1-tetralyl hydroperoxide
α,α-dimethylnaphthylmethyl hydroperoxide
α,α,α',α'-tetramethyl-p-xylylene dihydroperoxide Of the organo hydroperoxide compounds defined herein as suitable starting reactants, those wherein the total number of carbon atoms range from 7 to about 26, and wherein individual substituent hydrocarbyl groups such as alkyl or cycloalkyl substituents, contain from 1 to about 14 carbon atoms, may be employed in the production of compounds of particular value in specific fields of application.

Acids which are contacted with the organo hydroperoxides in accordance with the invention comprise the strong mineral acids such as sulfuric acid, hydrochloric acid and anhydrous hydrogen chloride. Of these acids hydrochloric acid and anhydrous hydrogen chloride are preferred. The amount of acid employed may vary considerably within the scope of the invention in accordance with the specific acid and reactant employed as well as the method of operation. Thus, a weight ratio of acid to cumene hydroperoxide in the reaction zone in the range of about 1:7.5 to about 2:1 may suitably be employed. Greater or lesser proportions of acid may, however, be employed within the scope of the invention. Maintenance of desired concentration of hydrogen chloride in the reaction mixture may be controlled by the use of superatmospheric pressure and/or the use of an appropriate solvent. Although hydrochloric acid and hydrogen chloride are chosen as the preferred acidic agents the invention is in no wise limited to the use of only these specific acids. As acids there may be employed the members of the broad class of strong mineral acids as well as acid-acting condensing agents, for example phosphoric acid, hydrobromic acid, hydrofluoric acid, acetyl chloride, bromotrifluoride complexes, and materials liberating an acid-acting agent under the conditions of execution of the process. Of these materials the strong acids, for example those having a dissociation constant greater than $10^{-3}$ and particularly the strong mineral acids are preferred.

Suitable auxiliary catalysts are the sulfur compounds having the formula $R^1$—S—$R^2$ wherein $R^1$ and $R^2$ are each the same or a different member of the group consisting of hydrogen and organic radicals which may be aliphatic, cycloaliphatic, aromatic or heterocyclic. Examples of such suitable auxiliary catalysts are hydrogen sulfide, the mercaptans, the mercaptals, mercaptols, thioacids, dithioacids, etc. Preferred auxiliary catalysts of the above group are those wherein $R^2$ is a hydrogen atom and $R^1$ is an organic radical. Particularly preferred are the alkyl mercaptans especially those having no more than four carbon atoms to the molecule, for example, butyl-, propyl-, ethyl-, and methyl mercaptan. Of the above-defined auxiliary catalysts, methyl mercaptan and ethyl mercaptan are employed with particular advantage.

Further examples of suitable auxiliary catalysts comprise the alkali metal salts of the thioacids, the mercaptides, the alkali metal and alkaline earth polysulfides such as sodium-, potassium-, and calcium polysulfide, the thiophenols such as thiophenol, p-methylthiophenol, o-ethylthiophenol, thioorganic acids such as thioacetic acid, thiopropionic acid, mercapto-substituted aliphatic acids, thioglycolic acid and the like. The scope of the invention, is however, not limited to the use of the sulfur compounds specifically mentioned hereinbefore and any member of the broad class of ionizable sulfur compounds may be employed, as well as compounds giving rise to the ionizable sulfur compounds under the reaction conditions employed. Preferred ionizable sulfur compounds employed as the essential auxiliary catalysts in the process of the invention comprise the ionizable sulfur compounds containing at least one sulfur atom having an apparent valence not greater than two. By the term "ionizable sulfur compounds" as employed in the present specification and appended claims is meant sulfur compounds capable of undergoing ionization in the presence of water with the formation of ions having a terminal sulfur atom bearing the ionic free valence.

The amount of sulfur compound added as the auxiliary catalyst in the process of the invention may vary widely within the scope of the invention. The amount preferably employed will vary in accordance with the nature of the specific hydroperoxide, acid, and the specific sulfur compound employed, as well as with the operating conditions. The use of relatively small amounts of the sulfur compounds will generally be sufficient to obtain the desired effect. When employing an alkyl mercaptan, such as methyl mercaptan or ethyl mercaptan as auxiliary catalyst, the presence of the auxiliary catalyst in amounts ranging, for example, from about 0.1 to about 5% and preferably from about 0.5 to about 2% by weight based upon cumene hydroperoxide charged are generally satisfactory. Higher or lower concentrations of the auxiliary catalyst may, however, be employed within the scope of the invention.

Conversions of organo hydroperoxide compounds in accordance with the invention is executed in the temperature range of, for example, from about −20° C. to about 100° C., and preferably from about 0° C. to about 60° C. Subatmospheric, atmospheric or superatmospheric pressures may be employed.

The reaction proceeds exothermically necessitating dissipation of evolved heat to a degree dependent upon specific charge materials employed to obtain optimum operating conditions. In a preferred method of operation the acid, and at least a part of the hydroperoxide, are admixed at a relatively low temperature and the temperature of the admixture thereafter raised. The auxiliary catalyst may be added in part, or in its entirety at the lower temperature or at the higher temperature. When converting an organo hydroperoxide such as, for example, cumene hydroperoxide, to 2,2-di(hydroxyphenyl) propane in the presence of a strong mineral acid and an alkyl mercaptan, such as ethyl mercaptan, as auxiliary catalyst, the acid and cumene hydroperoxide may be combined at a temperature in the range of, for example, from about −20 to about +35° C. and the mixture thereafter maintained at a higher temperature within the above-defined permissible range; the alkyl mercaptan being added before, during or after the introduction of at least a substantial part of the cumene hydroperoxide into the acid.

Diluents which are substantially inert under conditions of execution of the reaction may be employed. Thus, the cumene hydroperoxide to be rearranged, or the acid, or the auxiliary catalyst, may be dissolved, or suspended, in a suitable medium. A diluent, or solvent, for the reactant or the catalysts may be separately introduced into the system during the course of the operation. Diluents may suitably be employed to maintain reactants or product components which are solid under the conditions prevailing in the system, in the form of a slurry. They are also advantageously employed to maintain volatile. or relatively volatile materials, such as a gaseous acid catalyst, in contact with the reactant and auxiliary catalyst. Although a wide variety of diluents may be employed it is to be pointed out that only those are employed which are inert, or which do not adversely affect the conversion under the condition of execution of the process. Suitable diluents which may be employed comprise for example hydrocarbons such as paraffins, aromatics; alcohols such as methyl-, ethyl-, isopropyl-, isobutyl- alcohol; ethers; and the like. The presence of certain material such as, for example, ketones have been found to adversely influence the desired reaction. Thus, in the conversion of cumene hydroperoxide to 2,2-di(hydroxyphenyl) propane, the presence of substantial amounts of acetone appear to greatly reduce the yield of the desired reaction product and to increase materially production of undesired resinous by-products. The introduction of such undesirable materials into the system is, therefore, avoided and any such materials formed during the course of the reaction are preferably removed from the reaction zone at a relatively rapid rate.

The particular method of procedure preferably employed will vary in accordance with the materials charged. Thus, when employing a normally liquid acid the acid may be cooled to a relatively low temperature within the above-defined temperature range and the organo hydroperoxide added thereto. When employing a normally gaseous catalyst a solvent for the acid is introduced into the system, cooled to a relatively low temperature and the normally gaseous acid, such as, for example, anhydrous hydrogen chloride, introduced therein. The organo hydroperoxide and auxiliary catalyst are added to the resulting acid solution. The reaction may be completed at a higher temperature and introduction of the gaseous catalyst continued during at least a part of the time that the mixture is at the higher temperature.

The reaction may be executed in any suitable type of reactor such as an autoclave or a tubular-type of reactor. When employing tubular-type reactors, such as an elongated coil, reactant, acid, and/or auxiliary catalyst each may be separately injected into the reaction zone at spaced points along the length thereof. It is to be pointed out that the invention is in no wise limited to the use of a specific type of appartaus to obtain efficient contact between reactant and caalysts employed. Thus, apparatus employed may comprise conventional reaction zones wherein the cumene hydroperoxide, optionally dissolved in a solvent, is passed countercurrent to a flow of the acid catalyst, also optionally dissolved in a suitable solvent; the auxiliary catalyst being suspended or dissolved, in part or in its entirety in the reactant and/or the acid. When employing a normally gaseous catalyst, such as anhydrous hydrogen chloride, the reaction may be carried out by the passage of the cumene hydroperoxide, optionally dissolved in a suitable solvent, countercurrent to a flow of gaseous acid. Maintenance of desired temperature conditions is facilitated by the use of reaction zones comprising reactors of the elongated coil or of the film-flow type.

Under the above-defined conditions the organo hydroperoxide and phenolic compound will undergo rearrangement with the formation of a reaction mixture comprising hydroxyaryl-substituted organic compounds including hydroxyaryl-substituted compounds wherein the nuclei of two phenolic radicals are directly attached by carbon-to-carbon linkage to a single carbon atom as represented by the following empirical formula:

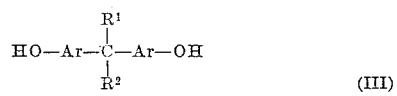

$$\text{HO—Ar—}\underset{\underset{R^2}{|}}{\overset{\overset{R^1}{|}}{C}}\text{—Ar—OH} \qquad (III)$$

wherein each $R^1$ and $R^2$ is the same or a different member of the group consisting of hydrogen and monovalent organic radicals including hydrocarbon radicals such as alkyl, cycloalkyl, aryl, alkaryl and aralkyl which may be saturated or unsaturated, and Ar—OH is a phenolic radical. In the bis(hydroxyaryl) methanes represented by formula III the aryl nucleus Ar of the phenolic radicals Ar—OH and each of the radicals $R^1$ and $R^2$ have the same significance as in the above defined formula I representing the suitable organic hydroperoxide starting materials. Hydroxyphenyl-substituted compounds, having a specifically desired composition and structure, are therefore obtained in accordance with the invention by the judicious selection of specific organo hydroperoxides as starting reactants. Thus, the conversion of an alkylphenyl hydroperoxide such as, for example, α,α-dimethylbenzyl hydroperoxide (cumene hydroperoxide) will result in reaction products comprising gem,bis-(hydroxyphenyl) propane. The reaction products obtained will generally comprise isomeric forms of the bis(hydroxyaryl) compounds.

The reaction mixture produced, comprising the desired bis,di-(hydroxyaryl) compounds, for example, bis(hydroxyphenyl) alkanes, is passed from the reaction zone into a suitable product separating zone. Separation of the desired bis(hydroxyphenyl) alkanes from the reaction mixture may comprise one or more such conventional steps as, for example, neutralization, startification, filtration, decantation, distillation, fractionation, solvent extracton, extractive distillation, and the like.

The following examples are illustrative of the invention:

*Example I*

To 2.5 parts by weight of 72.5% sulfuric acid, cooled to a temperature of about 3° C., there was added slowly with vigorous stirring one part by weight of cumene hydroperoxide. The temperature of the mixture was maintained in the range of from about 3 to about 8° C. during the cumene hydroperoxide addition and thereafter raised to 40° C. After standing at room temperature the resulting reaction mixture was found to contain as the predominant constitutent a very deep red, viscous liquid be-

Example II

To 2.5 parts by weight 72.5% sulfuric acid, cooled to about 5° C., there was added slowly with vigorous stirring one part by weight of cumene hydroperoxide and about 0.01 part of ethyl mercaptan. The temperature of the mixture was maintained in the range of from about 5° to about 8° C. during the cumene hydroperoxide addition, and thereafter raised to 40° C. After standing at room temperature a solid phase developed in the reaction mixture. The solid phase thus formed was separated by stratification, washed with water and subjected to vacuum distillation. By recrystallization from chlorobenzene of the vacuum distillation distillate there was obtained a yield of 31.6% of 2,2-di(4-hydroxyphenyl) propane of high purity based upon cumene hydroperoxide charged.

Example III

Normal heptane was saturated with anyhdrous hydrogen at 0° C. To two parts by weight of the resulting hydrogen chloride solution there was added slowly one part by weight of cumene hydroperoxide and 0.005 part by weight of ethyl mercaptan. The temperature of the mixture was maintained in the range of from about 0° to about 8° C. during the cumene hydroperoxide addition. The introduction of hydrogen chloride was continued for 30 minutes. The reaction mixture was maintained at a temperature of 20° C. for a period of about 310 hours. A solid phase was separated from the resulting reaction mixture and stripped under vacuum. The stripped material was subjected to vacuum distillation at 0.3 mm. The fraction taken overhead at a stillhead temperature in the range of 200-226° C. was found to consist of high purity 2,2-di(4-hydroxyphenyl) propane, the melting point of which was 152-153° C. The yield of 2,2-di(4-hydroxyphenyl) propane thus obtained based on cumene hydroperoxide charged was 35.2%.

Example IV

Acetone was saturated with anhydrous hydrogen chloride at a temperature of 0° C. One part by weight of cumene hydroperoxide and 0.01 part of ethyl mercaptan were slowly added with stirring to 0.5 part of HCl-saturated acetone. The temperature was maintained in the range of from about 0° to about 9° C. during the cumene hydroperoxide addition. Hydrogen chloride introduction was continued for 30 minutes whereupon the admixture was raised to room temperature. The resulting reaction mixture was then allowed to stand for a period of about 310 hours. A complex reaction mixture was obtained wherein a very deep red, viscous liquid which is believed to be a self-condensation product of acetone appeared to be the principal constituent. The resulting reaction mixture was vacuum stripped and subjected to vacuum distillation at 0.3 mm. Recrystallization of the fraction taken overhead at a stillhead temperature of 200-226° C., resulted in the obtaining of a product consisting essentially of 2,2-di(4-hydroxyphenyl) propane. The yield of 2,2-di(4-hydroxyphenyl) propane thus obtained in the presence of added acetone as solvent was only about 10% based on cumene hydroperoxide charged.

The invention claimed is:

1. The process for the production of bis,di-(hydroxyaryl) compounds which comprises contacting an aralkyl hydroperoxide with a strong mineral acid in the presence of an ionizable sulfur compound represented by the formula $R^1$—S—$R^2$ wherein $R^1$ and $R^2$ each represent a member of the group consisting of hydrogen and aliphatic, cycloaliphatic, aromatic and heterocyclic organic radicals, and separating bis,di-(hydroxyaryl) compounds from the resulting reaction mixture.

2. The process for the production of a bis,di-(hydroxyphenyl) compound which comprises contacting a benzyl hydroperoxide with a strong mineral acid in the presence of an ionizable sulfur compound represented by the formula $R^1$—S—$R^2$ wherein $R^1$ and $R^2$ each represent a member of the group consisting of hydrogen and aliphatic, cycloaliphatic, aromatic and heterocyclic organic radicals, and separating a bis-di-(hydroxyphenyl) compound from the resulting reaction mixture.

3. The process for the production of a gem,bis-di(hydroxyphenyl) alkane which comprises contacting an $\alpha,\alpha$-dialkylbenzyl hydroperoxide with a strong mineral acid in the presence of an ionizable sulfur compound represented by the formula $R^1$—S—$R^2$ wherein $R^1$ and $R^2$ each represent a member of the group consisting of hydrogen and aliphatic, cycloaliphatic, aromatic and heterocyclic organic radicals, and separating a gem,bis-di(hydroxyphenyl) alkane from said reaction products.

4. The process for the production of a 2,2-di(hydroxyphenyl) propane which comprises contacting an $\alpha,\alpha$-dimethylbenzyl hydroperoxide with a strong mineral acid in the presence of an ionizable sulfur compound represented by the formula $R^1$—S—$R^2$ wherein $R^1$ and $R^2$ each represent a member of the group consisting of hydrogen and aliphatic, cycloaliphatic, aromatic and heterocyclic organic radicals, and separating a 2,2-di(hydroxyphenyl) propane from the resulting reaction mixture.

5. The process for the production of a 2,2-di(hydroxyphenyl)propane which comprises contacting an alpha, alpha-dimethylbenzyl hydroperoxide with a strong mineral acid in the presence of an alkyl mercaptan, and separating a 2,2-di(hydroxyphenyl)propane from the resulting reaction mixture.

6. The process in accordance with claim 4 wherein said strong mineral acid is hydrogen chloride.

7. The process for the production of 2,2-di(4-hydroxyphenyl) propane which comprises contacting $\alpha,\alpha$-dimethylbenzyl hydroperoxide with a strong mineral acid in the presence of an alkyl mercaptan, and separating 2,2-di(4-hydroxyphenyl) propane from the reaction mixture.

8. The process in accordance with claim 7 wherein said strong mineral acid is hydrogen chloride.

9. The process in accordance with claim 7 wherein said alkyl mercaptan is ethyl mercaptan.

References Cited in the file of this patent

UNITED STATES PATENTS 2,359,242     Perkins et al.     Sept. 26, 1944

OTHER REFERENCES

Kharasch et al., Jour. Organic Chemistry, vol. 15, pps. 748–752 (July 1950).